United States Patent
Cordes et al.

(10) Patent No.: US 10,060,614 B2
(45) Date of Patent: Aug. 28, 2018

(54) METHOD FOR DISPLAYING IMAGE CONTENTS AT A LIGHTING CONTROL CONSOLE

(71) Applicant: MA Lighting Technology GmbH, Waldbüttelbrunn (DE)

(72) Inventors: Hartmut Cordes, Bremen (DE); Michael Adenau, Wuerzburg (DE)

(73) Assignee: MA Lighting Technology GmbH, Waldbuttelbrunn (DE)

( * ) Notice: Subject to any disclaimer, the term of this patent is extended or adjusted under 35 U.S.C. 154(b) by 0 days.

(21) Appl. No.: 15/914,537

(22) Filed: Mar. 7, 2018

(65) Prior Publication Data
US 2018/0195710 A1 Jul. 12, 2018

Related U.S. Application Data

(62) Division of application No. 15/015,584, filed on Feb. 4, 2016, now Pat. No. 9,958,148.

(51) Int. Cl.
| | |
|---|---|
| H01H 9/00 | (2006.01) |
| F21V 33/00 | (2006.01) |
| H05B 37/02 | (2006.01) |
| H05B 33/08 | (2006.01) |
| G05G 1/10 | (2006.01) |
| F21Y 115/15 | (2016.01) |

(52) U.S. Cl.
CPC .............. *F21V 33/00* (2013.01); *G05G 1/10* (2013.01); *H05B 33/0803* (2013.01); *H05B 37/029* (2013.01); *H05B 37/0209* (2013.01); *H05B 37/0254* (2013.01); *F21Y 2115/15* (2016.08)

(58) Field of Classification Search
CPC ...... F21V 33/00; G05G 1/10; H05B 37/0254; H05B 33/0803; H05B 37/0209; H05B 37/029; F21Y 2115/15
See application file for complete search history.

(56) References Cited

U.S. PATENT DOCUMENTS

| | | | |
|---|---|---|---|
| 8,514,192 B2 * | 8/2013 | Adenau ................ | H05B 37/029 345/173 |
| 2006/0207867 A1 * | 9/2006 | Waddington ........... | H01H 9/181 200/315 |
| 2010/0124067 A1 * | 5/2010 | Hente ................... | F21V 21/096 362/398 |

* cited by examiner

*Primary Examiner* — Tracie Y Green
(74) *Attorney, Agent, or Firm* — Quarles & Brady LLP

(57) ABSTRACT

A lighting control console controls a lighting system, wherein digital adjusting commands are generated in the lighting control console, which commands can be transmitted to the lighting devices of the lighting system via data links. The lighting control console includes at least one digital processor and at least one digital memory for generating, managing and storing the adjusting commands, and wherein the lighting control console includes at least one display device for electronically displaying image elements, and wherein at least one rotary control is disposed in the operating panel of the lighting control console. The rotary control allows users to enter operating commands by rotating the rotary control. An electronic display field is disposed at the visible side of the rotary control visible to the user displays image contents related to the rotary control.

7 Claims, 3 Drawing Sheets

METHOD FOR DISPLAYING IMAGE CONTENTS AT A LIGHTING CONTROL CONSOLE

CROSS-REFERENCE TO RELATED APPLICATIONS

This application is a divisional of U.S. patent application Ser. No. 15/015,584 filed Feb. 4, 2016, and is incorporated herein by reference.

STATEMENT REGARDING FEDERALLY SPONSORED RESEARCH OR DEVELOPMENT

Not applicable.

FIELD OF THE INVENTION

The invention relates to a lighting control console having a rotary control and to a method for operating a lighting control console having a rotary control.

BACKGROUND OF THE INVENTION

Generic lighting control consoles serve to control lighting systems such as those employed in theaters or on concert stages, for instance. Routinely, said lighting systems comprise a plurality of lighting devices, for instance stage spotlights, wherein, in the lighting devices on their own, it is in many cases also possible to switch between a plurality of lighting states, for instance between different colors. These different lighting states of the lighting devices connected to the lighting control console in each instance can be controlled in the lighting program of the lighting control console by way of programmed parameters. Here, standard lighting systems may comprise up to several thousand lighting devices. In order to be able to control such complex lighting systems, the generic lighting control consoles are equipped with a digital processor, which permits digital data and signal processing. For storing the data, a digital memory is routinely provided, which in particular allows for storing or archiving of lighting programs.

For programming the lighting program or for controlling the lighting program while it is running, operators have to enter operating commands as input values. Said operating commands can, for instance, be the selection of a specific lighting device or the setting of a specific parameter. For entering these operating commands, mechanical operating elements, for instance key buttons, rotary controls or slide controls, are available at known lighting control consoles. Here, the operating commands being assigned to the individual operating elements may be altered by way of suitable menu changeovers in order to be able to program and control correspondingly complex lighting programs.

A display device for electronically displaying image elements is furthermore disposed in the known lighting control consoles in order to make it possible for operators to program or control the lighting control console. There is a physical distance between the individual operating elements for entering operating commands and the display device for displaying image elements, which may, for instance, be the numerical or graphical depiction of the input data entered before. Here, the physical distance may amount to 50 cm or more, subject to the arrangement between the operating element and the display device. Said physical distance makes it harder to operate the lighting control console intuitively since the operators, owing to the physical distance, cannot simultaneously keep an eye on the operating element itself and the display device. In particular when programming the lighting control console by means of an input of operating commands at rotary controls, this is a considerable disadvantage.

SUMMARY OF THE INVENTION

It is therefore the object of the present invention to propose a lighting control console that has a rotary control and makes possible a largely intuitive operation upon input of input commands. It is further the object of the present invention to propose a method for using the lighting control console in accordance with the invention. These objects are attained by way of a lighting control console or of a method for operating a lighting control console according to the teachings disclosed herein.

The lighting control console in accordance with one embodiment of the invention is characterized in that an electronic display field is disposed at the visible side of the rotary control, said side pointing to the user. By way of said additional display field arranged at the rotary control, it becomes possible to directly display to the operators, at the display field, image contents linked to the settings of the rotary control. By way of the direct physical arrangement of the additional display field at the rotary control, an intuitive operation of the lighting control console when programming operating commands by adjusting the rotary control is hence profoundly improved.

The display field at the rotary control can in principle present any geometry. In known lighting control consoles, the rotary controls usually present a circular outer circumference or an outer circumference in the shape of a segment of a circle. In order to be able to use the surface that is available at the visible side of the rotary control, for displaying image contents, to full capacity as far as possible, it is therefore particularly advantageous if the display field presents a circular outer circumference or an outer circumference in the shape of a segment of a circle, which coincides with the geometry of the surface that users have at their disposal at the visible side of the rotary control.

In addition, largely any displaying technique can be utilized for realizing the display field at the rotary control. In particular with regard to realizing circular display fields or those in the shape of a segment of a circle, it is, however, particularly advantageous if the image pixels of the display field are formed by OLED elements. Such OLED display fields are technically available and can be manufactured with largely any geometry.

The additional display field can, in the simplest form, simply be fastened on the visible side of an available rotary control. Nonetheless, a particular type of the electrical connection of the display field is then required since the rotary control is rotatorily turned during operation of the lighting control console, such that the electrical connecting lines between the display field on the one hand and the housing of the lighting control console on the other hand also have to make a corresponding rotating adjustment possible. Hereunto, sliding contacts, for instance, may be disposed at the rotary control. In order to simplify the electrical connection of the display field on the rotary control, it is particularly advantageous if the rotary control is made up of an adjusting element that can be rotated and of a display element that is rigidly fastened to the lighting control console. The operating commands can then be entered by the users by rotating the adjusting element. The display element, which is rigidly fastened to the housing of the lighting control console, in contrast serves to fasten the display field. Since the display field itself, in this manner, does not take an active part in the rotating of the adjusting element, a correspondingly simple electrical connection technique for connecting the display element to the controlling means of the lighting control console, for instance by utilizing simple plug cables, can be employed.

It is particularly advantageous if the adjusting element that can be rotated is embodied in the manner of an adjusting ring that is borne so as to be rotatable and if the display element that is rigidly borne at the housing of the lighting control console is embodied in the manner of a circle element, wherein the circle element is arranged in the middle of the adjusting ring.

In another embodiment of the invention an inventive method for using the lighting control console comprises the following characteristic method steps:
calculating electronic image data for displaying an image content at the display field of a rotary control in the digital processor of the lighting control console; transmitting the electronic image data to the rotary control; displaying the image content at the display field of the rotary control.

In order to further improve the intuitive use of the rotary control by way of displaying image contents at the display field, it is particularly advantageous if the current adjusting angle between the rotary control and the lighting control console is evaluated, in order to determine whether, for instance, the rotary control has been adjusted by way of the movements of the operator. This current adjusting angle is then figured into the calculation of the image data for displaying the image content at the display field in order to correspondingly adapt, for instance, the relative angle of the image content with respect to the housing of the lighting control console.

In case the display field is connected to the rotatable part of the rotary control, it is particularly advantageous if, upon change of the adjusting angle between the rotary control and the lighting control console, the image content, at the display field, is displayed with a relative angle that does not change, with respect to the operating panel of the lighting control console. In this way, it can, for instance, be achieved that, when the rotary control is rotated, the image content displayed at the rotary control seems to be fixed as against the housing of the lighting control console, such that the user gains the visual impression that the image content displayed at the display field is not involved in the rotary motion of the rotary control.

The method in accordance with the invention is particularly advantageous when programming and controlling so-called gobo elements, which are connected to the lighting control console. By way of adjusting of the rotary control, a gobo element can then be rotated or programmed, wherein a symbolized gobo element is displayed at the display field, the relative angle of said symbolized gobo element with respect to the operating panel of the lighting control console changing in a fashion corresponding to the current angle of rotation of the gobo element. In this respect, the position of the gobo element is intuitively displayed to the operators as a function of the adjustment of the rotary control.

Preferably, it should be envisaged when displaying the symbolized gobo element that it is displayed subject to the angle of rotation of the gobo element that can be adjusted with the help of the rotary control, the relative angle with respect to the operating panel of the lighting control console changing.

In order to provide the operator with additional information, it is advantageous if the value of the relative angle of the displayed symbolized gobo element with respect to the operating panel of the lighting control console is additionally displayed at the display field. If the position of the gobo element, for instance, corresponds to 90°, the numerical value of 90 can be shown at the display field.

As already outlined, the image contents at the display field of the rotary control may be displayed with a fixed relative angle or with a changing relative angle with respect to the housing of the lighting control console. In accordance with a preferred method variant, it is envisaged that this is simultaneously realized in that the display field is divided into at least two subareas. The image contents in the first subarea can then be displayed with relative angles with respect to the operating panel of the lighting control console that do not change, whereas the image contents in the second subarea are displayed with changing relative angles with respect to the operating panel of the lighting control console.

In the drawings, one embodiment of the invention is schematically illustrated and will be explained by way of example in the following.

DETAILED DESCRIPTION OF THE EXAMPLE EMBODIMENTS

Figure 1:
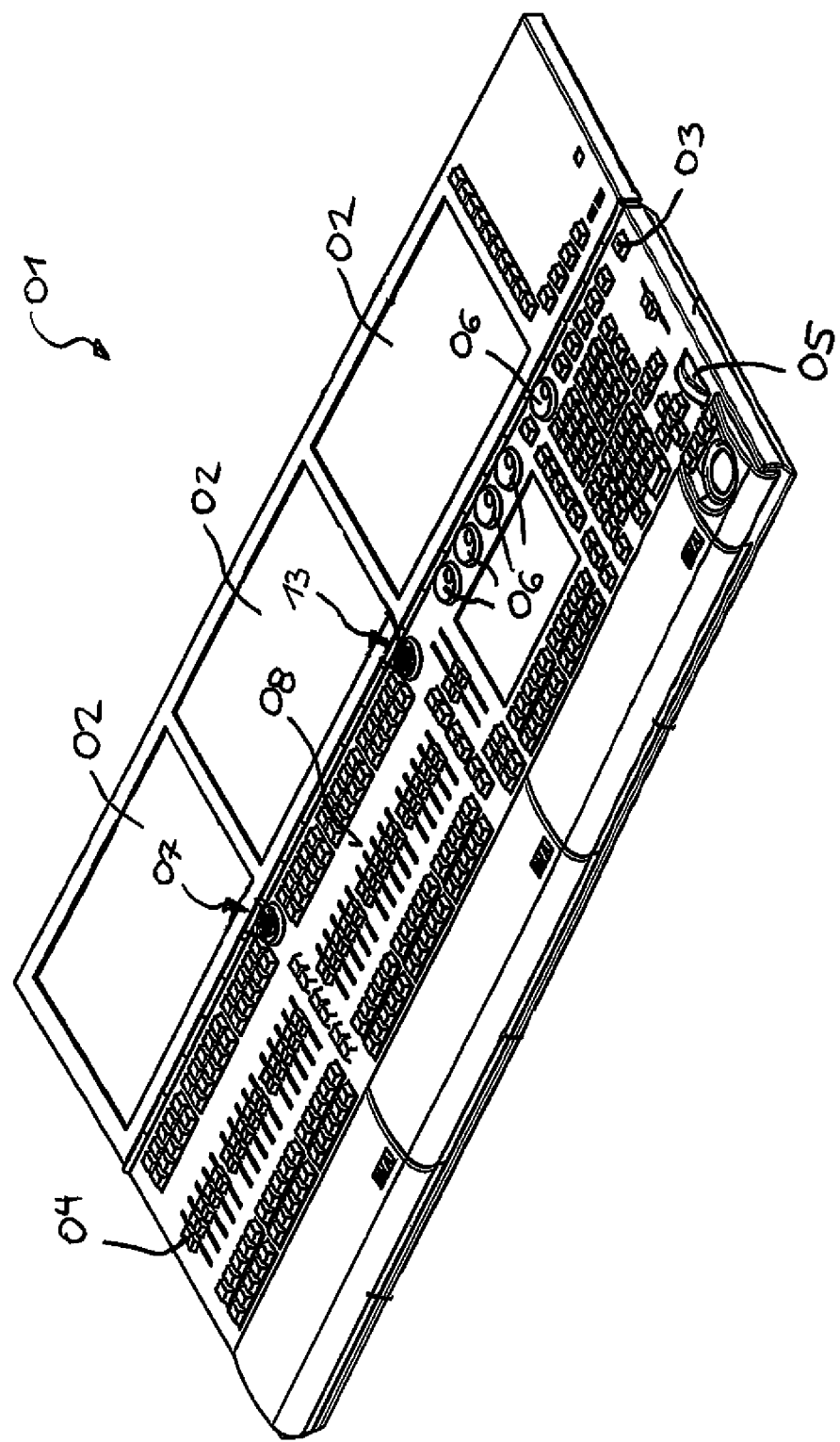
FIG. 1 shows a lighting control console having two rotary controls, a display field being arranged at the visible side of said controls.

In a perspective view, FIG. 1 shows an inventive lighting control console 01 for programming and controlling a stage lighting system. The lighting control console 01 is equipped with three monitors 02 for displaying various menus for users. For entering adjusting commands, a plurality of push buttons 03, slide controls 04 and adjusting wheels 05 is disposed at the lighting control console 01. Besides, for entering operating commands, the operating panel 08 of the lighting control console is fitted with five simple rotary controls 06 and two rotary controls 07 and 13. Here, the rotary controls 07 and 13 are characterized in that a display field 09 or 15 is arranged at their visible sides.

Figure 2:
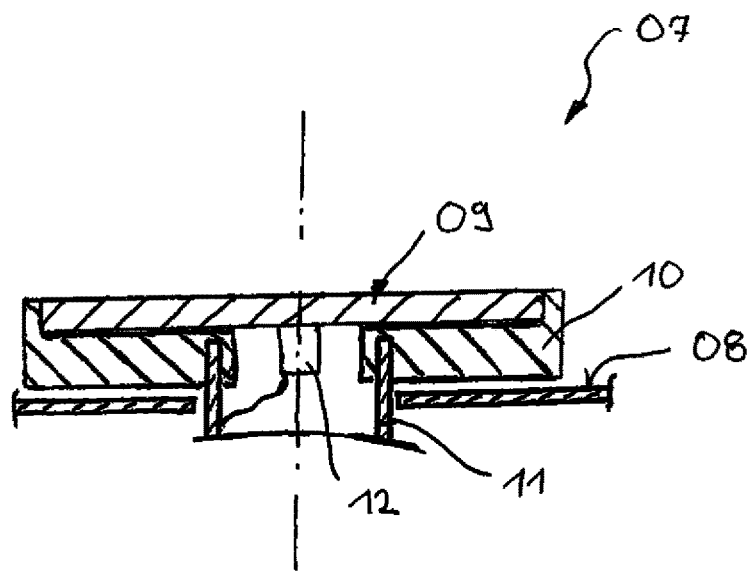
FIG. 2 shows the rotary control having a display field and pertaining to the lighting control console, in accordance with FIG. 1, in a cross-section.

FIG. 2 shows the upper part of the rotary control 07 having the display field 09 in a cross-section. The display field 09 is accommodated in a depression of a plastic sheave 10 at the visible side of the rotary control 07. The plastic sheave 10 on its part is connected to a sensor system (not illustrated) by means of a hollow shaft 11 borne so as to be rotatable, with the help of which sensor system the angle of rotation of the rotary control 07 can be evaluated. Via a plug-in contact 12, the display field 09 is electrically connected to the controlling means arranged in the inside of the housing of the lighting control console 01.

Figure 3:
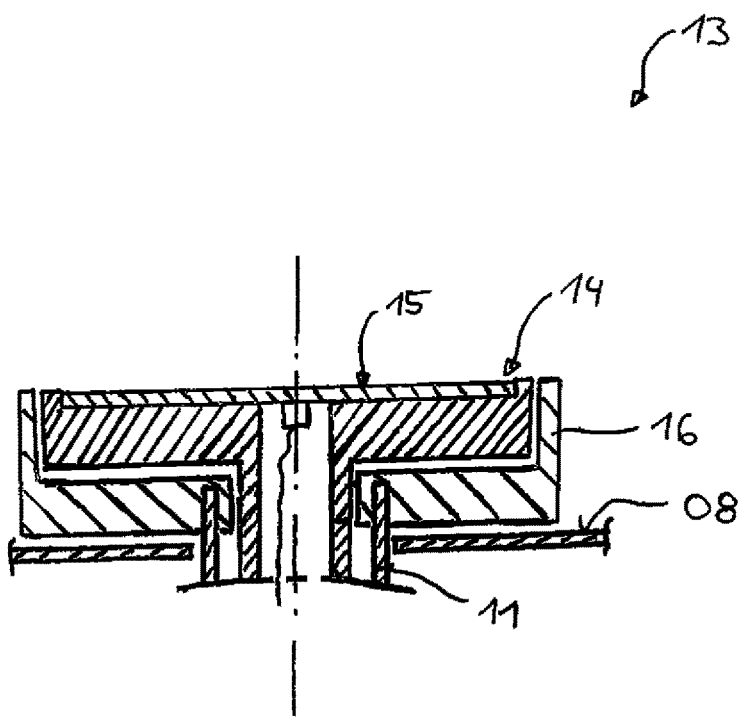
FIG. 3 shows a second embodiment of a rotary control having a display field in a cross-section.

FIG. 3 shows a second embodiment 13 of a rotary control in a cross-section. As opposed to rotary control 07, a display element 14, which is rigidly borne in the housing of the lighting control console 01, is disposed in rotary control 13, a display field 15 for displaying image contents being arranged at the visible side of said display element. Here, the display element 14 is arranged in the middle of the adjusting element 16 which can be rotated, and which is embodied in the manner of an adjusting ring. By way of rotating of the adjusting element 16, the operators can make the desired operating entries, wherein corresponding feedback signals can be shown at the display field 15.

Figure 4:
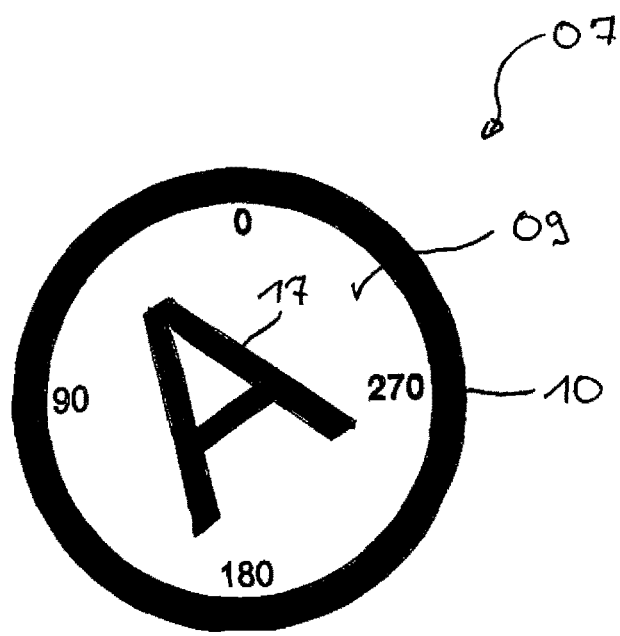
FIG. 4 shows the rotary control in accordance with FIG. 2 when displaying a first image content at the display field in a view from above.

FIG. 4 shows the rotary control 07 when displaying a first image content at the display field 09 in a view from above. Said image content may, for instance, be a symbolized gobo element, being a large "A" in the illustrated example. By way of a corresponding calculation of the graphic data for the display field 09, it is possible to display the symbolized gobo element 17 in a rotating fashion with a changing relative angle.

Figure 5:
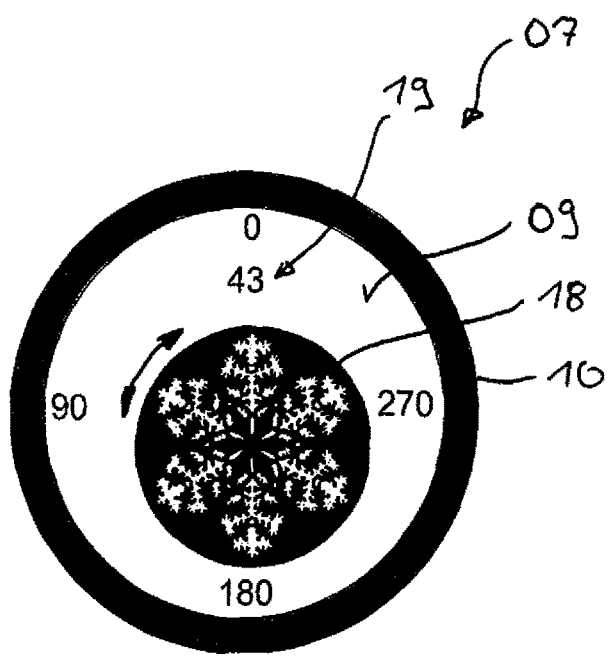
FIG. 5 shows the rotary control in accordance with FIG. 4 when displaying a second image content at the display field in a view from above.

FIG. 5 shows the rotary control 07 when displaying a second symbolized gobo element 18, namely a snowflake, at the display field 09. In a fashion corresponding to the rotation of the actual gobo element, the symbolized gobo element 18 is displayed in a rotating fashion at the display field 09. Value 19, namely 43° of the current relative angle of the displayed symbolized gobo element 18, is similarly displayed at the display field 09.

The invention claimed is:

1. A method for displaying image contents at a lighting control console when controlling a lighting system, wherein digital commands are generated in the lighting control console, which commands can be transmitted to the lighting devices of the lighting system via data links, and wherein the lighting control console includes at least one digital processor and at least one digital memory for generating, managing and storing the commands, and wherein the lighting control console includes at least one display device for electronically displaying image elements, and wherein at least one rotary control is disposed in an operating panel of the lighting control console, which rotary control allows a user to enter operating commands by rotating the rotary control, and wherein an electronic display field is disposed at a visible side of the rotary control visible to the user, image contents for the users being displayed at said display field, said method comprising:

calculating electronic image data for displaying image content at the display field of the rotary control in the digital processor;

transmitting the electronic image data to the rotary control; and displaying image content corresponding to the electronic image data at the display field of the rotary control.

2. The method according to claim 1, in which a current adjusting angle between the rotary control and the lighting control console is evaluated and incorporated into the calculation of the image data for displaying the image content at the display field.

3. The method according to claim 2, in which upon change of the adjusting angle between the rotary control and the lighting control console, the image content, at the display field, is displayed with a relative angle that does not change, with respect to the operating panel of the lighting control console.

4. The method according to the claim 1, in which by adjusting the rotary control, a gobo element is rotated, wherein a symbolized gobo element is displayed at the display field.

5. The method according to claim 4, in which the symbolized gobo element displayed at the display field is displayed subject to a current angle of rotation of the gobo element that can be adjusted with the help of the rotary control, wherein a relative angle of the symbolized gobo element with respect to the operating panel of the lighting control console changes in a fashion corresponding to the current angle of rotation of the gobo element that can be adjusted with the help of the rotary control.

6. The method according to claim 4, in which an angular value of the current angle of rotation of the gobo element that can be adjusted with the help of the rotary control is displayed at the display field.

7. The method according to claim 1, in which the display field is divided into at least two subareas, wherein a first image contents is displayed in the first subarea with a relative angle with respect to the operating panel of the lighting control console that does not change, and wherein a second image contents is displayed in the second subarea with a changing relative angle with respect to the operating panel of the lighting control console.

* * * * *